Jan. 6, 1931.  W. B. RAMSEY  1,788,325
INSECT TRAP
Filed May 11, 1929
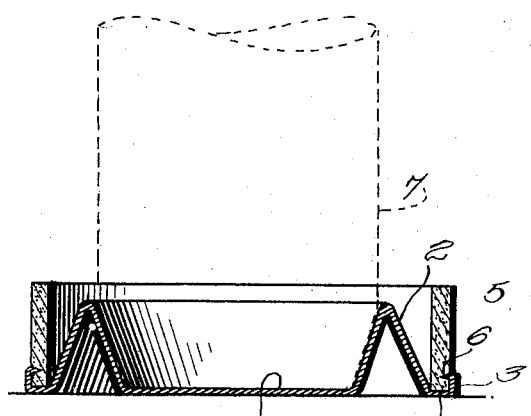
Fig. 1.
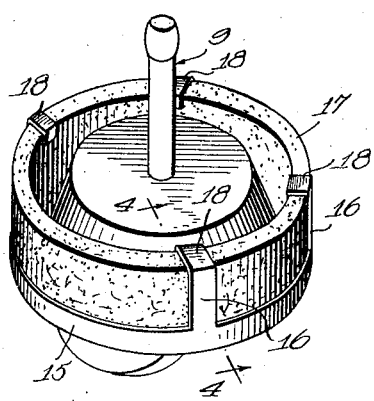
Fig. 3.
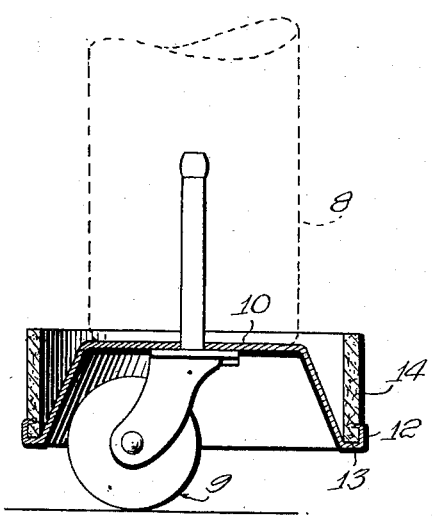
Fig. 2.
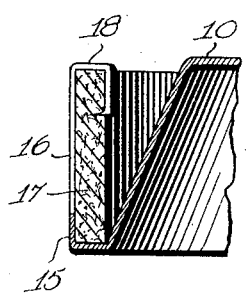
Fig. 4.
Inventor
W. B. RAMSEY
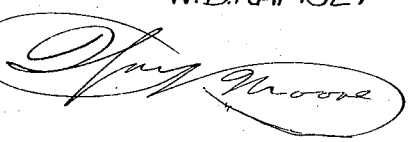
By
Attorney Patented Jan. 6, 1931

1,788,325

UNITED STATES PATENT OFFICE

WILLIAM B. RAMSEY, OF ATLANTA, GEORGIA

INSECT TRAP

Application filed May 11, 1929. Serial No. 362,293.

My invention relates to improvements in insect traps and relates to that type of trap used in preventing insects from crawling up the legs of chairs or tables.

The main object of my invention is the provision of a trap of this type or character which may be produced at a very small cost and which will absolutely prevent insects from passing up the legs of chairs or tables, making the device particularly desirable in countries where insects become a pest.

Another object of my invention is the provision of an insect trap which can be instantly applied or removed from the chair or table leg and which will not be unsightly or unattractive in appearance and which in every respect will prove useful, desirable and practical.

With these objects in view, my invention consists of an insect trap of the character stated embodying novel details of construction and arrangement of parts substantially as described and claimed and as shown in the accompanying drawing, in which:

Figure 1 represents a sectional view of an insect trap constructed in accordance with and embodying my invention shown in proper relation to a table leg.

Figure 2 represents a similar view, the trap being constructed for use and shown in connection with a chair leg and caster.

Figure 3 represents a perspective view of the insect trap of modified construction for use in connection with a chair leg and caster, and Figure 4 represents a view on line 4—4 of Figure 3.

In carrying my invention into effect, the trap is of the simplest and cheapest possible construction and is made from a single piece or blank of metal of circular shape in general outline and comprises the depressed seat or pan 1, the inclined rim 2, and the bead or flange 3, which forms the recess 4, in which is supported the felt ring 5, the bead or flange being preferably provided with an inturned sharp edge 6, which acts to retain the felt ring 5 in place, this form of invention being for use in connection with the table leg 7.

In the form of invention shown in Figure 2, and used in connection with a chair leg 8, and its caster 9, the platform or support 10 is provided which is formed with an inclined rim 11, having a bead 12 which forms the seat 13 for the felt or absorbent ring 14.

In the form shown in Figures 3 and 4, and which is particularly constructed for use in connection with a chair leg and caster, the inclined rim is provided with a bead 15 and at intervals is formed with vertical strips 16, which in connection with the bead form a support and seat for the felt or absorbent ring 17, the upper portion of said strips 16 being provided with hooked portions 18 which engage and sustain the said absorbent ring.

It will thus be seen that my trap provides a platform or support for the table or chair leg, a trap portion for the oil or liquid which is absorbed by the felt or absorbent ring, and the bead which retains the ring in place and permits its application and removal with ease when found desirable, and which will provide a trap which will absolutely prevent insects from passing up the chair or table leg and thus insure a practical and desirable article for the purposes intended.

It will be noted that my device comprises a horizontal portion upon which rest the table legs and that an inclined wall is formed with said platform and that said wall is provided with vertical flanges and that said flanges engage and secure the felt or absorbent ring in a vertical position, which, with the said inclined wall forms a trap or receptacle to receive the insect destroying material, the important feature being that the felt strip itself forms a part of the trap or receptacle by reason of its connection and vertical relation to said horizontal platform.

I claim:

1. An insect trap of the character described, consisting of a circular piece of metal, forming a supporting platform, an inclined rim and bead, and an absorbent ring retained in place by said bead and in proper relation to the platform and inclined rim, the edge of said inclined rim being formed with vertical flanges and the absorbent ring being engaged and retained by said flanges to form with said inclined rim a receptacle or trap for the insect destroying liquid.

2. An insect trap of the character described, consisting of a single piece of material, having a flat horizontal portion to support the chair or table leg, an outer turned-up portion to form a bead, flanges extending upward from said bead, and a felt or absorbent ring retained in a vertical position by reason of the flanges on said bead in proper relation to said flat horizontal portion.

3. An insect trap of the character described, consisting of a horizontal supporting portion, a rim extending from said platform, a bead surrounding said rim, a series of strips extending upward from said bead and formed with a hook, and an absorbent ring retained in place by said bead and hooked ends of said strips, said absorbent ring being normally disposed in a vertical position with reference to said rim and forming with the rim a trap or receptacle for insect destroying material.

In testimony whereof I affix my signature.

WILLIAM B. RAMSEY.